2,794,845
Patented June 4, 1957

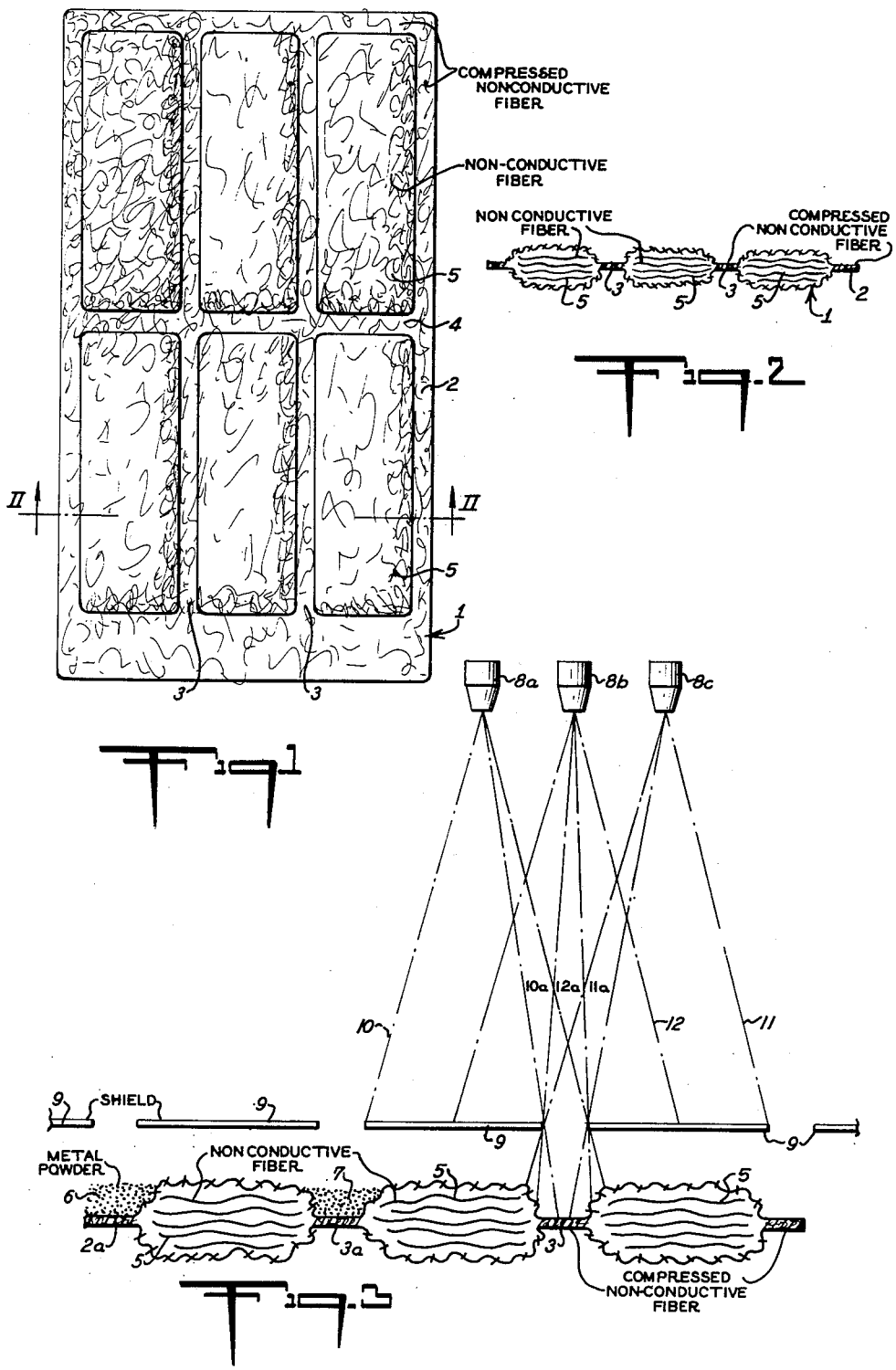

2,794,845

METHOD FOR PRODUCING ELECTRODES FOR GALVANIC ELEMENTS, ESPECIALLY ACCUMULATORS

Alf G. Grabe, Stockholm, Sweden

Application February 4, 1953, Serial No. 335,169

Claims priority, application Sweden February 11, 1952

8 Claims. (Cl. 136—67)

In U. S. Patent 2,636,916 to Licharz there is described an electrode for galvanic elements, especially accumulators, in which the base structural material for the active electrode mass consists of a batt of fibres of non-conductive material such as glass which is neutral with respect to the chemical processes occurring in the element. These fibres form a loosely packed batt the surface of which is substantially equal to the sum of the surfaces of the individual fibres. Each of said fibres in said batt is individually coated with a metal which does not participate in the chemical reactions taking place in the element and which is desistant to the electrolyte. The batt carries the active electrode material in such a way that each individual metal-coated fibre is substantially completely covered by a separate coating of such active electrode material. Under certain conditions it may even be unnecessary to provide the non-conductive fibres with a layer of a metal that does not participate in the electrochemical reactions occurring in the element. Thus, it may be sufficient to make the layer of active material so thick that not all of the material will participate in the electrochemical processes within the element, there being always left on the fibres a metal layer serving to lead off the current.

According to a feature of U. S. Patent 2,636,916, an electrode frame, intermediate strips joining respectively opposite sides of the frame and the intermeidate portions of the electrode may consist of the same material so as to form a unit, said frame and intermediate strips differing from the intermediate electrode portions by a higher degree of compression only. This method for forming the intermediate strips and the frame by strong compression of the respective portions of the coated fibre batt is easily applicable in practice, especially in and for the manufacture of electrodes for accumulators, because lead-plated fibres on application of strong pressure may be readily compressed to form a coherent metal layer.

The present invention relates to an improvement in and for the aforesaid manufacture of intermediate strips and frames for electrodes to be used in galvanic elements. I have found that the strip and frame of the electrode described in the Licharz patent, and likewise in the simplified form without a metal layer interposed between each fibre and its active material coating, when produced in accordance with the previously mentioned method, will not always be quite satisfactory in all respects; for instance, the fibres may be damaged during the compression of the strip and frame forming portions, especially in the transition areas between the compressed and non-compressed portions. Such damage may diminish or completely interrupt the electric conditions. The strips and frame produced according to the Licharz patent also have the disadvantage that due to said compression the electrodes will become thinner in the portions providing the contact strips and the frame than in their other portions.

According to the present invention, the intermediate strips and the frame for the galvanic element electrodes described in the Licharz patent, as well as the mentioned simplified form of electrode without a metal layer interposed between each fibre and its active material coating, are produced by subjecting the compressed portions to a further metal-plating process, the other portions of the electrode being screened off. This metal-plating process is preferably performed by means of a galvanic treatment but may also be brought about in other ways, e. g. by vacuum application of the metal in vaporised form or by spraying. As a rule it will be suitable to use the same metal for this metal-plating as for coating the fibres, although other metals, too, may be employed provided they will form an alloy with or adhere to the base metal and will not disturb the electrochemical reactions.

The additional metal-plating as mentioned above is carried out with simultaneous screen protection for the rest of the electrode portions that do not form either the contact strips or the frame, so that this additional plating will be applied only to the portions which will later on constitute said strips and frame. The screening may be effected with any desired isolation material, e. g. plates of ebonite or foils of plastic materials. These screen plates or foils should preferably have such a shape that not only the portions stiffened by compression but also narrow adjacent strips will be left uncovered. In this manner the subsequent metalizing process will give rise to the formation of a metallic juncture between the compressed portions and the other portions of the electrode. Clearly this is of great importance, especially if the fibres or threads have been damaged by the foregoing compression in said portions of transition between compressed and non-compressed portions to such an extent as to disturb or interrupt electric current conduction. The same effect may be achieved if the screen plates are given the same size and shape as the non-compressed part of the electrode plate, only in this case the screen plate must not be laid closely onto said electrode plate but should be disposed at a certain distance therefrom. During the electrolytical, vaporising or spraying process a certain amount of metal will then be precipiated also somewhat farther inward onto the electrode plate. The amount of the metal and its spreading may be controlled by varying the distance between the two plates.

Owing to the fact that the compressed portions are subjected to an additional metal-plating process in the manner described above, these portions can be given a thickness corresponding roughly to that of the other portions of the electrode. The duration of the metalizing treatment implying either a galvanising process or application of the metal in vaporised form or by spraying may be varied according to the degree of thickness desired for the strips and the frame. These portions will thus obtain a uniform and smooth surface.

The method according to the invention has proved to be very advantageous both for electrodes having only one intermediate strip emanating from their frame and for electrodes having one or more additional strips extending across the electrode in horizontal, vertical or oblique direction. Due attention must of course be paid to the construction of the electrode when choosing the shape of the screen plates or foils to be employed during the additional metal-plating treatment.

The method of the invention is also applicable in and for the manufacture of composite plates consisting of a plurality of single plates joined together by compression of the frames and contact strips and subsequent additional metal-plating.

As compared with other methods for producing a frame for electrodes of the aforesaid kind, e. g. immersion in a soldering bath, the method according to the invention has the considerable advantage of being less intricate and requiring very little manual work. For large-scale production of electrodes of this type, the method of the invention may be mechanized completely, and the results thus obtained are more satisfactory than those obtained by applying for instance the immersion procedure mentioned above.

The invention will now be explained in some particular respects with reference to the attached drawings in which:

Fig. 1 is a plan view of an electrode of the general type referred to in the Licharz patent, Fig. 2 is a cross-sectional view of the electrode along line II—II in Fig. 1.

Fig. 3 is the same cross-sectional view as that of Fig. 2 to an enlarged scale and complemented by a schematical representation of a metal-spraying device and screen means.

In Fig. 1 the electrode body 1 is a unitary structure cut from a batt of individually metal coated fibres of glass or similar non-conductive material. A fibre batt of this type is fully described in the Licharz patent referred to above. By strong compression the marginal portions 2 of this batt have been converted into a rigid frame surrounding the electrode on all four sides. Intermediate strip portions 3 and 4 extending between opposed sides of the frame 2 and adapted to stiffen the structure and improve current conduction in the electrode are likewise formed by compression of the respective portions of the fibre batt. The degree of compression of the frame 2 and strips 3, 4 in comparison with the uncompressed portions 5 surrounded by the frame and strips will appear from Fig. 2.

The application of the method according to the present invention can be seen from Fig. 3 in which the same electrode section is shown as in Fig. 2, however, with the left hand frame portion 2a and the left hand strip 3a already in a metal-plated condition as indicated at 6 and 7. It will be seen that the metal-plating layers 6 and 7 are of a thickness such that their upper surfaces are approximately flush with the upper surfaces of the uncompressed intermediate electrode portions 5.

In the embodiment shown, the electroplating apparatus is represented by the spray nozzle 8 of a spray gun shown in three successive working positions 8a, 8b and 8c that it will occupy among other positions as it is moved across the electrode surface at a suitable working distance.

Interposed between the working plane of nozzle 8 and the surface of electrode 1 and at some distance from the electrode surface are screen plates 9 of any suitable material, such as ebonite or other plastic material, such plates 9 being substantially co-extensive with the noncompressed electrode portions 5 and disposed above such portions.

Fig. 3 illustrates with regard to the right hand strip 3 the way in which the spray cone emanating from nozzle 8 during its movement from position 8a over position 8b to position 8c will act on strip 3 to build up thereon a metal plating layer corresponding to layer 7 on strip 3a. With nozzle 8 in position 8b, the central portion 12a of the spray cone 12 will hit substantially the whole width of strip 3, whereas the side portions 10a and 11a of the spray cones 10 and 11 emanating from nozzle 8 in positions 8a and 8c, will pass obliquely between screen plates 9 and build up the metal layer against and on the side faces of the adjacent electrode portions 5, as shown at 7 with respect to strip 3a and the adjacent electrode portions. In this way by the combined action of spray nozzle 8 and screen plates 9, the depressions on the electrode surface formed by the compression of the frame and strip portions will be filled with a compact metal layer to about the level of the surface of the uncompressed electrode portions.

The application of the principles illustrated in Fig. 3 in connection with a metal spraying gun to devices for the vacuum application of vaporised metal will be obvious. If the metal vapor emanates from a distant stationary source it will obviously only be necessary to reduce the shielding area of the screen plates to such an extent that the desirable extension of the deposited metal layer towards the side faces of the uncompressed electrode portions is achieved. Obviously insulating screen plates may be used in a substantially analogous way in the galvanic deposition of the metal layer on the compressed frame and strip portions of an electrode of the general type referred to here.

What I claim is:

1. The method of manufacturing an electrode for a galvanic element comprising the steps of forming a loosely packed batt of non-conductive fibres, depositing active electrode material on said batt in such a way that each individual fibre is substantially completely covered by a separate coating of such active electrode material, forming a frame and intermediate strips joining opposite sides of the frame on the electrode body by subjecting the respective portions of the fibre batt to strong compression, and subjecting only the compressed portions to a metal-plating process and thereby reinforcing the network of said frame and intermediate strips.

2. The method of manufacturing an electrode for a galvanic element comprising the steps of forming a loosely packed batt of non-conductive fibres, depositing active electrode material on said batt in such a way that each individual fibre is substantially completely covered by a separate coating of such active electrode material, forming a frame and intermediate strips joining opposite sides of the frame on the electrode body by subjecting the respective portions of the fibre batt to strong compression, screening off the electrode portions intermediate said compressed frame and strip portions and subjecting only the compressed portions to a metal-plating process and thereby reinforcing the network of said frame and intermediate strips.

3. The method as claimed in claim 2 in which said metal-plating process is carried out electrolytically.

4. The method as claimed in claim 2 in which said metal-plating process is carried out by deposition of the metal in vapor phase under vacuum conditions.

5. The method as claimed in claim 2 in which said metal-plating process is carried out by spraying.

6. The method of manufacturing an electrode for a galvanic element comprising the steps of forming a loosely packed batt of non-conductive fibres, depositing active electrode material on said batt in such a way that each individual fibre is substantially completely covered by a separate coating of such active electrode material, forming a frame and intermediate strips joining opposite sides of the frame on the electrode body by subjecting the respective portions of the fibre batt to strong compression, disposing screen means conforming to the electrode portions intermediate said compressed frame and strip portions on such intermediate portions in such a way as to prevent such intermediate portions from being metalplated during a subsequent metal-plating treatment, and subjecting the electrode body to such metal-plating treatment whereby only the compressed frame and strip portions will be metal-plated and thereby reinforcing the network of said frame and intermediate strips.

7. The method of manufacturing an electrode for a galvanic element comprising the steps of forming a loosely packed batt of non-conductive fibres, depositing active electrode material on said batt in such a way that each individual fibre is substantially completely covered by a separate coating of such active electrode material, forming a frame and intermediate strips joining opposite sides of the frame on the electrode body by subjecting the respective portions of the fiber batt to strong compression, disposing screen means at some distance from all the electrode portions surrounded by said compressed frame and strip portions in the path of action of a device for projecting plating metal against the electrode, and subjecting the electrode body to metal-plating treatment by means of said device whereby said compressed frame and strip portions and adjacent areas of the electrode portions surrounded by said compressed frame and strip portions will be metal-plated and thereby reinforcing the network of said frame and intermediate strips.

8. The method of manufacturing an electrode for a galvanic element comprising the steps of forming a loosely packed batt of non-conductive fibres, depositing active electrode material on said batt in such a way that each individual fibre is substantially completely covered by a separate coating of such active electrode material, forming a frame and intermediate strips joining opposite sides of the frame on the electrode body by subjecting the respective portions of the fibre batt to strong compression, and subjecting only the compressed portions to a metal-plating process to such an extent that the metal layer deposited thereon substantially restores said portions to their original thickness prior to compression and thereby reinforcing the network of said frame and intermediate strips.

References Cited in the file of this patent
UNITED STATES PATENTS

| | | |
|---|---|---|
| 1,639,280 | Benner et al. | Aug. 16, 1927 |
| 2,304,073 | Brennan | Dec. 8, 1942 |
| 2,446,524 | Brennan | Aug. 10, 1948 |
| 2,544,112 | Schneider | Mar. 6, 1951 |
| 2,563,936 | Huntsberger | Aug. 14, 1951 |
| 2,610,220 | Brennan | Sept. 9, 1952 |
| 2,616,165 | Brennan | Nov. 4, 1952 |
| 2,636,916 | Licharz | Apr. 28, 1953 |
| 2,640,865 | Brennan | June 2, 1953 |